United States Patent
Wüest et al.

(10) Patent No.: US 9,983,085 B2
(45) Date of Patent: May 29, 2018

(54) METHOD OF AND APPARATUS FOR MEASURING VACUUM PRESSURE

(71) Applicant: INFICON GMBH, Bad Ragaz (CH)

(72) Inventors: Martin Wüest, Malans (CH); Christian Berg, Stafa (CH)

(73) Assignee: INFICON GMBH, Bad Ragaz (CH)

( * ) Notice: Subject to any disclaimer, the term of this patent is extended or adjusted under 35 U.S.C. 154(b) by 155 days.

(21) Appl. No.: 14/917,782

(22) PCT Filed: Sep. 9, 2013

(86) PCT No.: PCT/EP2013/068564
§ 371 (c)(1),
(2) Date: Mar. 9, 2016

(87) PCT Pub. No.: WO2015/032442
PCT Pub. Date: Mar. 12, 2015

(65) Prior Publication Data
US 2016/0223418 A1 Aug. 4, 2016

(51) Int. Cl.
| | |
|---|---|
| G01L 27/00 | (2006.01) |
| G01L 21/02 | (2006.01) |
| G01L 9/00 | (2006.01) |
| G01L 13/02 | (2006.01) |
| G01L 21/00 | (2006.01) |
| G01M 99/00 | (2011.01) |

(52) U.S. Cl.
CPC ........... *G01L 21/02* (2013.01); *G01L 9/0072* (2013.01); *G01L 9/0075* (2013.01); *G01L 13/025* (2013.01); *G01L 21/00* (2013.01); *G01M 99/00* (2013.01)

(58) Field of Classification Search
CPC ... G01L 9/0072; G01L 9/0075; G01L 13/025; G01L 21/00; G01L 21/02
USPC .............................................. 73/1.58, 31.04
See application file for complete search history.

(56) References Cited

U.S. PATENT DOCUMENTS

| | | | | |
|---|---|---|---|---|
| 2,784,373 A | * | 3/1957 | Lawrance | G01M 3/329 324/461 |
| 7,403,020 B2 | * | 7/2008 | Braun | G01R 27/2605 324/658 |
| 2001/0006003 A1 | * | 7/2001 | Lehmann | G01M 3/3281 73/49.3 |
| 2008/0010030 A1 | | 1/2008 | Cheung et al. | |
| 2008/0110008 A1 | * | 5/2008 | Walchli | G01L 9/0079 29/407.08 |

FOREIGN PATENT DOCUMENTS

JP 2011-075480 4/2011

OTHER PUBLICATIONS

International Preliminary Report on Patentability—PCT/EP2013/068564—dated Mar. 24, 2016, 6 pages.
International Search Report and Written Opinion for PCT App No. PCT/EP2013/068564, dated Jul. 18, 2014, 8 pgs.

* cited by examiner

*Primary Examiner* — Benjamin Schmitt
(74) *Attorney, Agent, or Firm* — Procopio, Cory, Hargreaves & Savitch LLP (57) ABSTRACT

Vacuum pressure of a gas in a compartment (1) is measured. The vacuum pressure is established by a pump arrangement (3,5) with a pulsating pumping effect (g(t)). The shape of the resulting pulsation of the pressure (p(t)) in compartment (1) is exploited (15) as an indication of the operation status of the pump arrangement (3,5).

37 Claims, 7 Drawing Sheets

METHOD OF AND APPARATUS FOR MEASURING VACUUM PRESSURE

This application is a National Stage entry of PCT/EP2013/068564, filed on Sep. 9, 2013, the content of which is incorporated by reference in its entirety.

FIELD OF INVENTION

The present invention is directed on a method of measuring vacuum pressure of a gas in a compartment, whereby the pressure therein is established by the action of a pump arrangement having a pulsating pumping effect.

SUMMARY

It is an object of the present invention to improve such method of measuring.

This is achieved by the addressed method, which comprises monitoring the vacuum-pressure and, preferably, exploiting a shape of pulsating of the vacuum pressure as an indication of operation status of the pump arrangement.

Thereby the method of measuring vacuum pressure is improved by providing additional information, besides of information about the prevailing pressure in the compartment, namely information about operation status of the pump arrangement, as with respect to aging, too high tolerances, etc.

Definition

When we speak throughout the present description and claims of a "pump arrangement" we understand the pump as well as connecting lines from the suctioning port of the pump to the compartment as well as from the blowing port of the pump downstream. Thereby, all members arranged along the addressed connecting lines, which do influence the pumping effect in the compartment, are included in the term "pump arrangement" as for instance flow cross-section restrictions, controllable valves, etc.

In one embodiment of the method according to the invention, which may be combined with any of the embodiment of the method subsequently to be addressed, unless in contradiction, the compartment is evacuated by the addressed pump arrangement. By means of a pressure sensor, the prevailing pressure course in the compartment including shape of pulsating of the pressure course is monitored, whereby a measuring signal is generated which represents the prevailing pressure course. In dependency of the output signal of the pressure sensor, a signal indicative of the prevailing pressure in the compartment averaged over at least one period of the pulsating is generated.

In an embodiment of the just addressed embodiment, a reference signal is provided, which represents at least a part of a reference shape of pulsating. The measuring signal and the reference signal are compared and it is the result of such comparing which is exploited as indication of the prevailing operation status of the pump arrangement possibly in addition to exploiting directly the measuring signal.

The shape of pulsating may be highly indicative for the operation status of the pump arrangement already considered along a predetermined and known section of the pulsating period. In such a case, the reference signal must only provide for a reference of pulsating shape along that predetermined section of period.

Because the pressure course in the compartment is pulsating, it is the average over at least one period of such pulsating, which is indicative for the pressure value to be achieved by the pump arrangement in the compartment.

In an embodiment of the just addressed embodiment, the electric reference signal is provided by evacuating by means of a reference pump arrangement of equal construction as the pump arrangement, a reference compartment. By means of a further pressure sensor, the prevailing reference pressure course in the reference compartment including reference shape of pulsating of the reference pressure course, is monitored. Thereby, reference signal is generated. At least a part of the electric reference signal, representing at least a part of the reference shape of pulsating of the reference pressure course, is stored.

With respect to storing at least a part of the reference shape of pulsating of the reference pressure course the same prevails as was addressed above: If the shape of pulsating in the compartment the pressure of which being measured according to the invention, significantly varies only along a part of the pulsating period, it is only necessary to store that part of the reference shape of pulsating of the reference electric signal, which accords with the addressed predetermined and known section of pulsating period.

In a further embodiment of the just addressed embodiment of the method according to the invention, addressing providing a reference signal, the reference compartment is selected to be equal to the compartment from which pressure is to be measured or the reference compartment is selected to be the addressed compartment, wherefrom pressure is to be measured.

In a further embodiment of the method according to the invention, the further sensor applied for providing the reference signal is equal to the sensor exploited for pressure measurement or the further sensor is realized by the addressed sensor for pressure measurement itself.

In a further embodiment of the method according to the invention, the reference pump arrangement is realized by the pump arrangement acting on the compartment, from which pressure is to be measured.

Thus, if the reference compartment is selected to be the compartment, the pressure therein being measured, and the further sensor is selected to be the sensor exploited for pressure measurement and further the reference pump arrangement is selected to be the pump arrangement evacuating the compartment, wherefrom pressure is to be measured, in fact the same equipment is used, first to provide the reference signal and then to preform pressure measurement and to monitor the operation status of the pump arrangement.

The reference signal data representing at least a part of the shape of pulsating in a reference compartment by a reference pump arrangement, may also be provided e.g. on a chip by the manufacturer of the pump or may even be online retrieved e.g. from a server of the pump manufacturer.

In a further embodiment of the method according to the invention, which may be combined with any pre-addressed embodiment and embodiment still to be addressed, unless in contradiction, monitoring of the pressure course in the compartment comprises sampling a signal, which depends from the output signal of the pressure sensor, at a sampling frequency, which is at least 10 times, preferably at least 20 times higher than the fundamental frequency of pulsating of the pressure course in the compartment. This sampling frequency is selected to be preferably at least 1 kHz, even more preferably 20 kHz.

Definition

We understand under "fundamental frequency", the first harmonic frequency of the periodic pulsating which thus accords with the inverted value of the pulsating period.

If the addressed monitoring is performed by sampling, then the addressed high frequency sampling allows to most accurately monitor the shape of the pulsating.

In a further embodiment of the method according to the invention, which may be combined with any embodiment already addressed or to be addressed, unless in contradiction, during providing the reference signal the reference pressure course in the reference compartment is monitored. This monitoring comprises sampling a signal which depends from an output signal of the further pressure sensor, which is used for reference signal providing, at a sample frequency, which is at least 10 times, preferably at least 20 times higher, than the fundamental frequency of pulsating of the reference pressure course. This sampling frequency is selected to be preferably at least 1 kHz, even more preferably 20 kHz.

Here too, the fundamental frequency of pulsating is the first harmonic of the pulsating signal and accords with the inverse value of the pulsating period.

In a further embodiment of the method according to the invention, which may be combined with any of the pre-addressed embodiments and of the embodiments still to be addressed, unless in contradiction, monitoring of the pressure prevailing in the compartment by the pressure sensor comprises providing a measuring capacitor with two electrodes, the capacity of the capacitor being dependent from the pressure in the compartment.

The course of the addressed capacity of the capacitor is electrically monitored.

In a further embodiment of the method according to the invention, which may be combined with any of the pre-addressed embodiments and embodiments still to be addressed, unless in contraction, and addressing providing a reference signal, monitoring by the further sensor comprises providing a measuring capacitor with two electrodes, the capacity of the capacitor being dependent from the pressure in the reference compartment. The course of the just addressed capacity is electrically monitored.

In a further embodiment of the method according to the invention, which may be combined with any of the pre-addressed embodiments and embodiments still to be addressed, unless in contradiction, the course of the pressure dependent capacity of at least one of the pressure sensor and of the further pressure sensor is sampled, whereby each single sampling comprises charging and discharging the capacitor, thereby performing at least one of charging and of discharging of the capacitor via a resistive element of predetermined resistivity, together with the capacity, is decisive for the time course of at least one of charging and of discharging. A timespan during the at least one of charging and of discharging via the resistive element and between a first predetermined charging level and a second predetermined charging level of said capacitor is measured. Please note that the addressed resistive element needs not to be a resistor, but can be realized by analog switch in conducting state, a connecting line etc.

Because the timespan necessitated by the charging and/or discharging process of the capacitor through the addressed resistive element of known resistivity, defines for the prevailing value of the capacity of the addressed capacitor, most accurate time measurement directly leads to determination of the momentarily prevailing capacity value. The capacity value momentarily prevailing, is determined by the pressure momentarily prevailing, so that from the measured timespan the momentarily prevailing pressure in the compartment and/or the reference compartment may be calculated.

In a further embodiment of the just addressed embodiment, measuring of the timespan the charging and/or discharging process necessitate to rise or to drop from a first predetermined charging level to a second predetermined charging level of the capacitor is performed by Time to Digital Conversion (TDC) as e.g. addressed in the U.S. Ser. No. 07/403,020 B2.

In a further embodiment of the method according to the present invention, which may be combined with any of the pre-addressed embodiments or embodiments still to be addressed, unless in contradiction, and which exploits at least one capacitance pressure sensor, one of the electrodes of the sensing capacitor comprises a ceramic material membrane, preferably made of $Al_2O_3$.

In a further embodiment of the method according to the present invention, which may be combined with any of the pre-addressed embodiments and embodiments still to be addressed, unless in contradiction, there is established a negative feedback control of at least one of the pressure value in the compartment, averaged over at least one period of pulsating, and of the shape of pulsating. Thereby a difference of a reference signal to a signal representing the prevailing pressure in the compartment is exploited as control deviation signal. The pump arrangement is exploited as an adjusting member within the negative feedback loop.

In a further embodiment of the method according to the invention, which may be combined with any preaddressed embodiment, if not in contradiction, signal processing comprises processing by digital signal processing.

The present invention is further directed to an apparatus for measuring vacuum pressure in a compartment evacuated by a pump arrangement, which causes a pulsating pressure course in the compartment. So as to improve such apparatus for measuring, it comprises monitoring means for monitoring at least a part of the pulse shape of a pulsating pressure and evaluation means—e.g. an electronic display—for evaluating the part of the pulse shape monitored by said means for monitoring. It further comprises generating means for generating a pressure indicative signal representing an averaged pressure value, averaged over a predetermined timespan.

In an embodiment of the apparatus according to the present invention, which may be combined with any of the subsequently addressed embodiments of the apparatus, unless in contradiction, the monitoring means as well as the generating means comprise a common capacitance pressure sensor with a capacitor, the capacity thereof being dependent from an input pressure to be measured. The addressed means for monitoring further comprises means for charging and discharging the capacitor, thereby at least one of the charging and discharging through a resistive element, which, together with the capacitor, is decisive for the course of the charging and/or discharging process of the capacitor. Thus, at least one of charging and of discharging the capacitor is performed through a resistive element of predetermined resistivity valve. The monitoring means further comprises time measuring means for measuring a time span, which is characteristic for the at least one of said charging and of said discharging through the addressed resistive element.

In a further embodiment of the just addressed embodiment of the apparatus, it comprises a clock unit, which controls the charging and discharging cycle of the addressed capacitor at a repetition or sampling frequency, which is at least 10 times, preferably at least 20 times higher than the fundamental frequency of an expected pulsating of the pulsating pressure, which sampling frequency is preferably at least 1 kHz and even more preferred at least 10 kHz.

In a further embodiment, especially of the just addressed embodiment, the time measuring means comprises a Time to Digital Converter (TDC). Thereby, the addressed time, which is characteristic for the charging and/or discharging process of the capacitor through the resistive element, is highly accurately measured, resulting in a highly accurate pressure value sample.

In a further embodiment, especially of the embodiment exploiting Time to Digital Conversion, the evaluation means comprises a Digital Signal Processing unit (DSP) as e.g. an ASIC.

According to a further embodiment of the apparatus, which may be combined with any of the addressed embodiments and embodiments still to be addressed, unless in contradiction, the monitoring means and the generating means comprise a common pressure sensor and at least the monitoring means comprise sampling means for sampling the output signal of the common pressure sensor at a sampling frequency which is at least 10 times, preferably at least 20 times higher than a fundamental frequency of an expected pressure pulsating to be evaluated by the evaluation means. Thereby and to cope with pulsating frequency as caused by most of the commonly used pumps providing such pulsating pumping effect, the sampling frequency is preferably selected to be at least 1 kHz, and even more preferred to be at least 10 kHz.

Still in a further embodiment, which may be combined with any of the preaddressed embodiments of the apparatus and with any subsequently addressed embodiments, the monitoring means and the generating means comprise a common capacitance pressure sensor with a capacitor, the capacity thereof being dependent from an input pressure and said capacitor comprising a membrane electrode of a ceramic material, preferably made of $Al_2O_3$.

According to a further embodiment of the apparatus, which may be combined with any of the pre-addressed embodiments of the apparatus as well as with any of the embodiments to be addressed, unless in contradiction, the evaluation means comprises comparing means for comparing a signal, which represents the addressed at least part of the shape of pulsating with a signal, which represents a reference shape of pulsating.

Still in a further embodiment of the apparatus, which may be combined with any of the pre-addressed embodiments, unless in contradiction, the evaluation means comprises comparing means for comparing a signal representing a prevailing pressure with a reference signal representing a desired pressure, the result of said comparing being applied to adjust operation of the pump arrangement in at least one negative feedback loop.

BRIEF DESCRIPTION OF DRAWINGS

The invention shall now further be exemplified with the help of figures.

The figures show.

DETAILED DESCRIPTION

Figure 1:
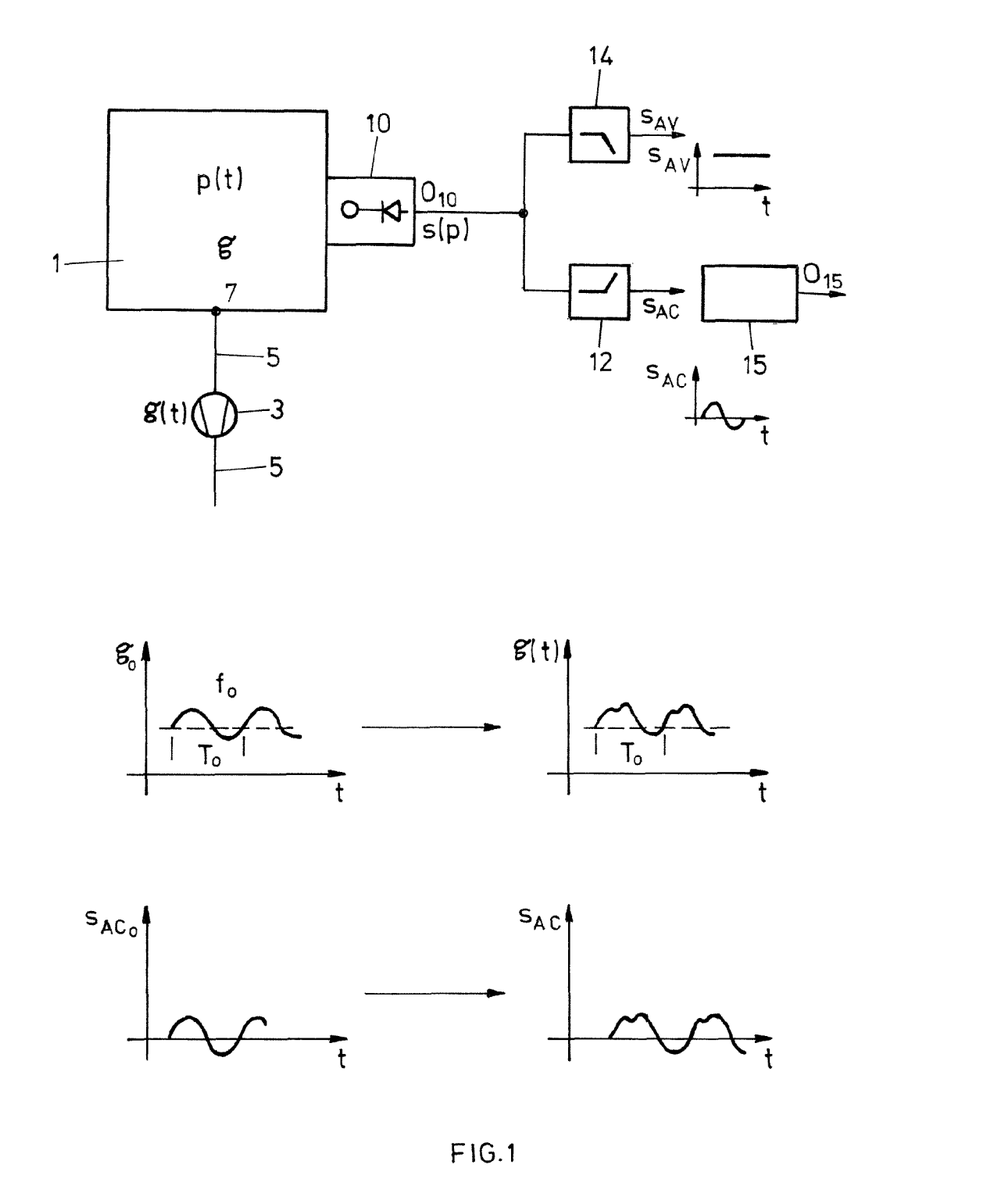
FIG. 1: schematically and simplified a signal flow/functional block representation of a first embodiment of an apparatus according to the present invention and operating the method according to the invention.

FIG. 1 shows, by means of a simplified signal flow/functional block diagram the principle of an apparatus according to the present invention, operating the method according to the invention.

A compartment 1 filled with a gas is evacuated by a pump 3 of pump arrangement 3, 5. The pump 3 is of a type which provides a pulsating pumping effect, i.e. the amount of gas pumped by pump 3 fluctuates or pulsates at a fundamental frequency which is dependent primarily from the operating speed of pump 3. Pumps of this type are e.g. membrane pumps, piston pumps, rotary vane pumps, etc.

In FIG. 1 the fluctuation of the pumping effect, i.e. fluctuation of the delivery rate of pump 3 is qualitatively shown by the characteristic g(t).

The pulsating delivery rate characteristic may vary from one pump arrangement to another pump arrangement of same type or, considered at one pump arrangement, may vary over time as e.g. due to aging the pump arrangement 3, 5.

For operating the pump arrangement 3, 5 there is expected for that pump arrangement a determined pulsating effect as indicated by $g_o(t)_n$. Such pulsating occurs at a fundamental frequency $f_o$, which accords with the inversed pulsating period $T_o$. The actually installed pump arrangement 3, 5 may nevertheless provide just from the beginning of its operation or after some time of operation, a pulsating pumping effect g(t) at the addressed fundamental frequency $f_o$, whereas the shape of pulsating may be different from the expected one, according to $g_o(t)$. Thus, the pump arrangement 3, 5 providing for the pumping effect g(t) does then not operate as expected. Such different operation may or may not lead to the conclusion that pump 3 and/or parts of lines 5 should be exchanged or should be serviced. According to the present invention under its most generic aspect the pressure within compartment 1 is monitored as by a pressure sensor 10. As the pulsating pumping effect g(t) is pictured by the pressure p(t) within compartment 1, there appears at the output $O_{10}$ of the pressure sensor 10 a pressure indicative signal which pulsates as well at the fundamental frequency $f_o$ and with a respectively prevailing shape of pulsating. The component AC of pulsating out of the pressure indicative output signal s(p) of pressure sensor 10 may be selectively separated e.g. by a high pass filter 12, whereas the component AV representing the average pressure level may be separate from the output signal s(p) by means of low pass filter 14. Whereas the pulsating signal component AC according to the output Signal $s_{AC}$ of high pass filter 12 is thus indicative for i.e. an indication of the operation status—e.g. proper of faulty operation—of pump arrangement 3, 5, the average output signal component of pressure sensor 10, as output signal $s_{AV}$ of the low pass filter 14 is indicative of the pressure level prevailing in compartment 1.

The prevailing pulsating component of the output signal of pressure sensor 10, which accords with the pulsating component of the pressure p(t) within compartment 1 at the frequency $f_o$, and which accords with the output signal $s_{AC}$ of high pass filter 12, is evaluated by or in an evaluation unit 15. In the most simple variant evaluation unit 15 is just realized by a display unit, displaying especially the prevailing shape of pulsating. More sophisticated the evaluation unit 15 generates an electric output signal at an output $O_{15}$, which is indicative for the difference of the shape of the prevailing pulsating with respect to an expected shape of such pulsating. Such signal may be further evaluated e.g. for indicating whether pump arrangement 3, 5 has to be serviced or replaced or has to be differently operated, etc.

Providing the filters 14 and 12 as of FIG. 1 may not be necessary, if the addressed pulsating shape is evaluated e.g. directly from the output signal s(p) of pressure sensor 10. Thereby, an expected overall pressure course is compared with the prevailing overall pressure course.

Figure 2:
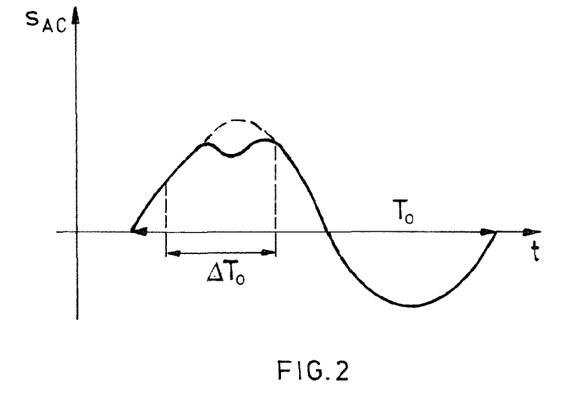
FIG. 2: in a pressure versus time qualitative diagram, a prevailing pressure pulsating and a reference pressure pulsating, which defer only along a part of the pulsating period.

In FIG. 2, as a qualitative example, the pulsating component of the output signal s(p) of the pressure sensor 10, according to $S_{AC}$, is shown, as possibly displayed by unit 15.

If, from experience, it is known that, e.g. due to aging of pump arrangement 3, 5 the shape of pulsating varies only in a part along the pulsating period $T_o$, it may suffice to evaluate the shape only in a predetermined section of period $T_o$ of the periodically pulsating signal $S_{AC}$. Such section is shown by $\Delta T_o$ in FIG. 2. In this case only a part of the shape of the addressed pulsating may be surveyed, according to the section of period $\Delta T_o$ for overall surveying operation status of the pump arrangement 3, 5.

Figure 3:
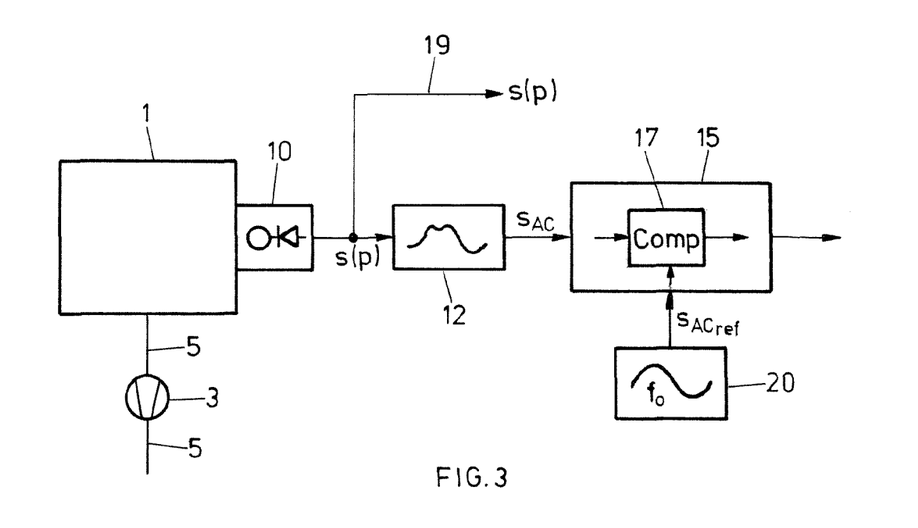
FIG. 3: a further embodiment of an apparatus according to the invention in a schematic and simplified signal flow/functional block diagram.

FIG. 3 shows in a simplified and schematic signal flow/functional block diagram, in analogy to the representation of FIG. 1, an embodiment of the apparatus according to the invention operating the method according to the invention. Parts and signals which have already been addressed in context with FIG. 1 are provided in FIG. 3 with the same references as in FIG. 1. The pulsating signal component of output signal s(p) of pressure sensor 10 is input e.g. via high pass filter 12 to the evaluation unit 15. Therein, a signal dependent on signal $S_{AC}$ is compared in a comparing unit 17 with a reference signal $S_{ACref}$ which represents the expected shape of pulsating e.g. at the frequency $f_o$ or represents at least a part of the expected shape along a predetermined section of period $\Delta T_o$ as was addressed in context with FIG. 2. In comparing unit 17 the shape of the prevailing pulsating or a part of such shape is compared with an expected shape of pulsating e.g. at said frequency $f_o$ or just with a part of the expected shape.

Additionally, the output signal of pressure sensor 10 is exploited, as shown in FIG. 3 at 19, as pressure measurement signal.

Figure 4:
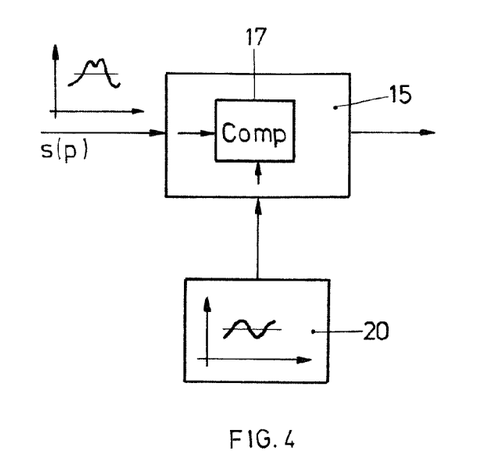
FIG. 4: a further embodiment of a part of the apparatus according to FIG. 3, in a schematic and simplified signal flow/functional block diagram.

As shown in FIG. 4 at the comparator unit 17 the overall output signal s(p) of pressure sensor 10 may directly be compared with an expected overall pressure signal $S_{ref}(p)$.

As shown in FIGS. 3 and 4 for comparing purposes at comparing unit 17, a reference signal is provided and input to the comparing unit 17. Such reference signal, schematically shown as provided in or by a reference signal unit 20, may be provided in different ways.

The remote reference signal may be provided from an instance from the location, where the invention is practiced, e.g. from a data server of the manufacturer of pump 3 via an online communication.

Alternatively, such reference signal may be delivered on a storing medium as on a chip e.g. from the pump manufacturer. Alternatively, the addressed reference signal may be provided in the frame of operating the present invention.

Figure 5:
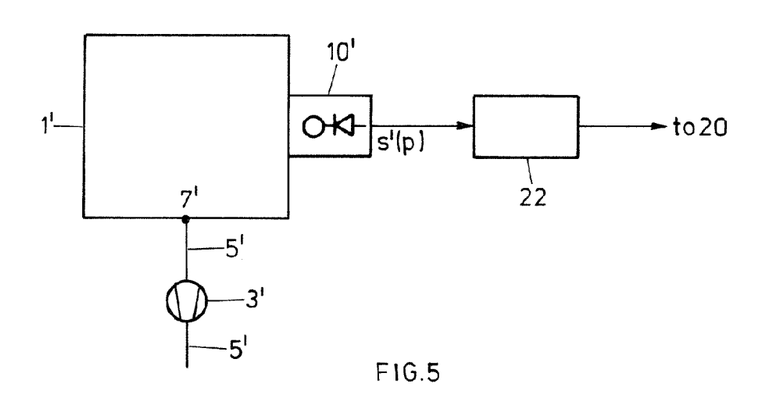
FIG. 5: by a simplified and schematic signal flow/functional block diagram, an apparatus or a part of the apparatus according to the invention, for providing a reference signal.

FIG. 5 shows by means of a simplified signal flow/functional block diagram, in analogy to the representations of FIGS. 1, 3 and 4, an apparatus and a method for providing the reference signal as was addressed in context with FIGS. 3 and 4. Via upstream and downstream pumping lines 5', a pump 3' is connected to a compartment 1' and establishes vacuum pressure therein. The pump arrangement 3', 5' is at least approximately of equal type as pump arrangement 3, 5 used to evacuate compartment 1. Pump arrangement 3', 5' is operated e.g. substantially identically to intended operation of pump arrangement 3, 5 of the apparatus and method as of FIGS. 1, 3, and 4. Nevertheless, pump arrangement 3', 5' has been checked and approved to act as a reference pump arrangement.

By means of a pressure sensor 10' the pressure in the reference compartment 1' is monitored. The output signal s'(p) of the pressure sensor 10' represents the pressure course in reference compartment 1' and at least a part thereof is stored in a storing unit 22, e.g. just the pulsating component of the signal s'(p) or with an eye on the explanations in context with FIG. 2, just a part of such pulse shape according to a predetermined section of period $\Delta T_o$. The signal stored in storing unit 22 is the reference signal which is applied to the comparing unit 17.

Whereas reference pump arrangement 3', 5' may just be of the same type as pump arrangement 3, 5, in a good embodiment pump arrangement 3', 5' exploited for generating the reference signal, is the same as pump arrangement 3, 5, latter exploited for evacuating compartment 1. Thereby, in a further good embodiment pump arrangement 3', 5' is the pump arrangement 3, 5.

Further and in a good embodiment the reference compartment 1' is selected to be equal to the compartment 1, upon which the invention according to FIG. 3 is practiced. In a further good embodiment the reference compartment 1' is the compartment 1.

Still further, the reference pressure sensor 10' is selected to be the same as the pressure 10 exploited in the frame of the invention as e.g. addressed in the embodiment of FIG. 3. In a good embodiment the reference pressure sensor 10' is the pressure sensor 10.

Generically, one may say that evaluating within evaluation unit 15, if making use of comparing as by comparator unit 17 of FIG. 4, becomes the more straight forward the more that the overall system for providing the reference signal as of FIG. 5 is equal to the system operated in practice and e.g. according to FIG. 3 and as concerns generating and monitoring the respective pressures in the respective compartments 1',1.

In a most straight forward embodiment of the present invention the reference signal is, generically spoken, provided when the system according e.g. to FIG. 3 is first operated with a pump arrangement 3, 5, which has been approved as operating as expected.

Figure 6:
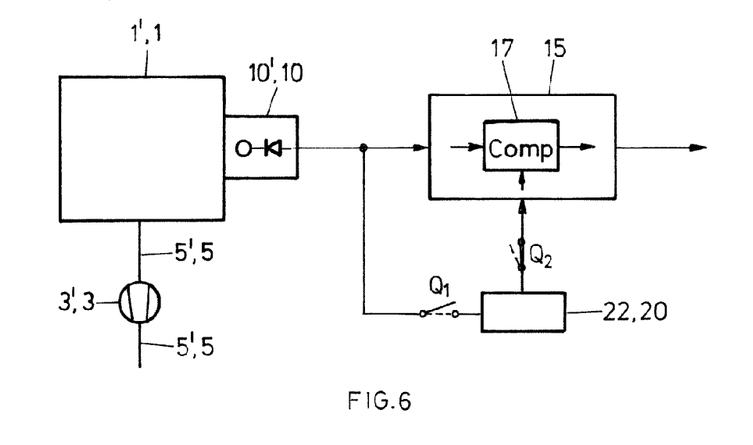
FIG. 6: by a simplified signal flow/functional block diagram, an embodiment of the apparatus according to the present invention, whereat, prior to practical operation, a reference signal is generated.

FIG. 6 shows in a simplified and schematic signal flow/functional block diagram, in analogy to the representation in FIG. 3, such an embodiment. Please note that in FIG. 6 those elements and signals which first act as reference members or reference signals and then as members and signals during measuring application are addressed with both respective reference signs e.g. according to FIG. 3 and FIG. 5. Thus, at first the pump arrangement 3',3,5,5' is exploited as a reference pump arrangement upon compartment 1',1, first acting as reference compartment 1'. The pressure is sensed by sensor 10', 10, first acting as a reference pressure sensor 10'. The prevailing pressure course in the container 1', 1 is stored in storing unit 22, as schematically shown in FIG. 6, by closing a switch Q1 interconnecting the output of the sensor 10', 10 with the input to the storing unit 22. Afterwards, switch Q1 is opened, and the storing unit 22, now acting as reference signal unit 20, is operationally connected to the comparing unit 17, e.g. by closing switch Q2. From now on the prevailing output signal of the pressure sensor 10', 10, now acting as pressure sensor 10, is compared in comparator unit 17 of the evaluation unit 15 with the reference signal in reference unit 20.

In a good embodiment of the invention the pressure course in the reference compartment 1' as well as the pressure course in the compartment 1 is monitored by sampling. So as to provide a good representation of the shape of pulsating of the addressed pressure course, the sampling frequency is selected considerably higher than the fundamental frequency $f_o$ of the pulsating component of the pressure course as caused by the pulsating pumping effect $g_o$, g of the pump arrangements 3', 5' and 3, 5. Thus, in a good embodiment the addressed pressure course is sampled with a sampling frequency which is at least 10 times, even better at least 20 times higher than the fundamental frequency $f_o$ of the addressed pulsating.

Clearly, the sampling frequency for providing the reference signal as of FIG. 5 and during operation of the system and method according to the invention e.g. as of FIG. 3 or 6, may be different.

In a good embodiment of the method and the apparatus according to the invention the sensor 10 as well as the reference sensor 10' are capacitance pressure sensors with a capacitor comprising two electrodes and wherein the capacity of the addressed capacitor is dependent on the sensed pressure.

Figure 7:
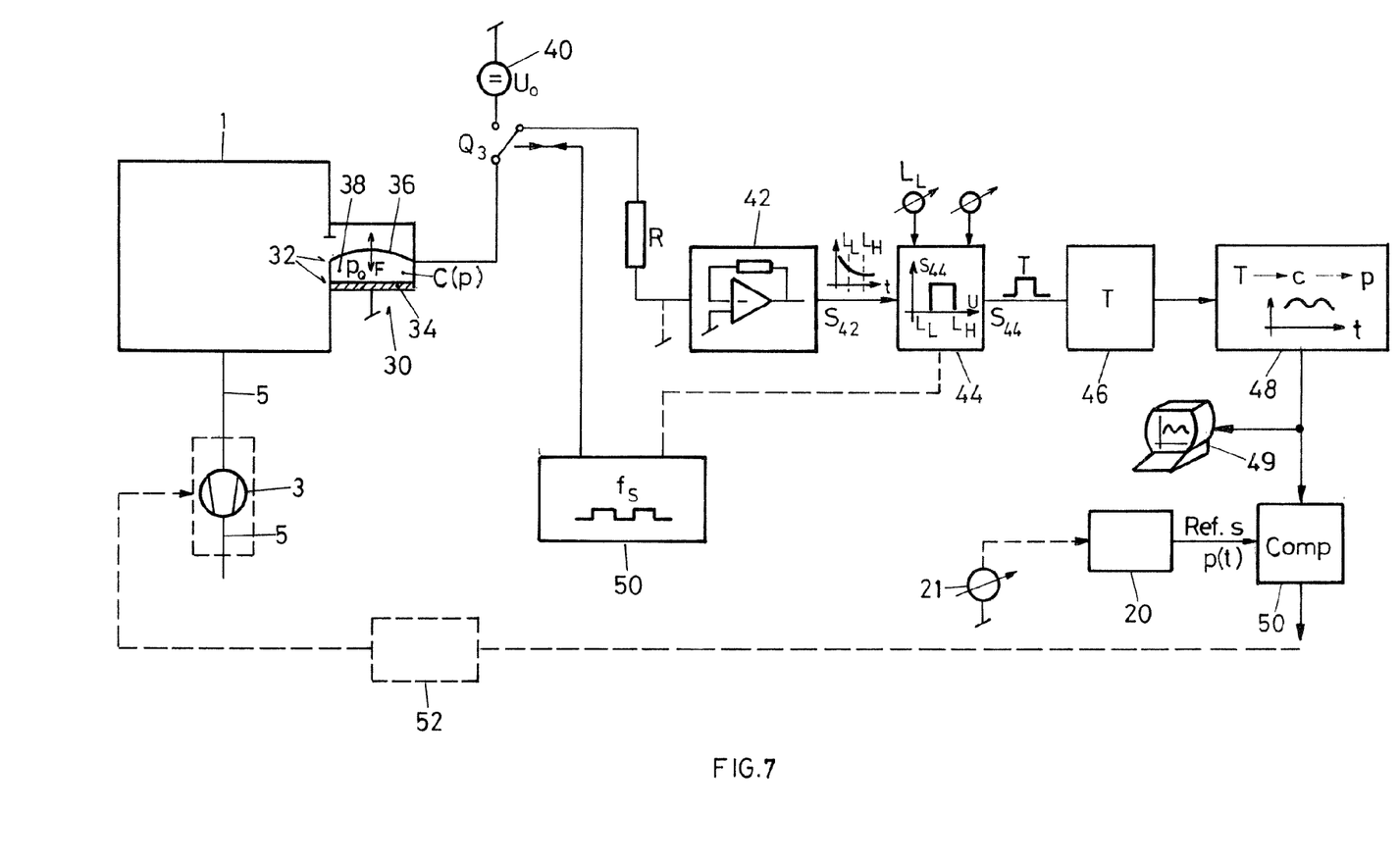
FIG. 7: by a more detailed but still simplified and schematic signal flow/functional block diagram an embodiment of the apparatus according to the invention and operating the method according to the invention as today realized.

In FIG. 7 there is shown, in a simplified and schematic signal-flow/functional-block diagram a good embodiment of the method and apparatus according to the present invention and as today practiced, wherein exploiting a capacitance pressure sensor and a sampling technique for the pressure prevailing in the respective compartment are combined. FIG. 7 thereby shows the method and system whereat the reference signal has already been provided, which e.g. is realized according to the embodiment of FIG. 6, in that the same system as of FIG. 7 is first exploited to provide the reference signal.

According to FIG. 7 the pressure course within compartment 1 is sensed by means of a capacitance pressure sensor 30. As schematically shown such capacitance pressure sensor comprises a capacitor 32, the capacity thereof being dependent on the pressure as sensed. The capacitor 32 comprises, as an example, a rigid electrode 34 and, as a second electrode, a membrane 36. One side of membrane 36 is exposed to a reference pressure $p_o$ within a sealed compartment 38 between the electrodes of capacitor 32, membrane 36 and rigid electrode 36. The second surface of membrane 36 is exposed, as schematically shown in FIG. 7, to a space in which the pressure to be measured prevails.

As a function of pressure difference between pressure to be measured and reference pressure $p_o$, the membrane electrode 36 is deformed, e.g. bowing more or less out towards the lower of the addressed two pressures and as schematically shown by a double arrow F in FIG. 7. Thereby, the capacity C(p) of the capacitor 32 varies, dependent on the pressure to be measured in compartment 1.

The capacitor 32 is intermittently charged to a voltage $U_o$ of a source 40 by closing a switch $Q_3$. Charging the capacitor 32 occurs very fast, as there is practically no resistivity limiting charging current.

After having charged the capacitor 32 the capacitor 32 is discharged via a resistive element R of accurately known resistivity value. According to FIG. 7 this is performed by switching the switch $Q_3$ to one tap of resistive element R. Generically spoken, the time course of the discharge process of capacitor 32, is exclusively governed by C(p) and R. As shown in FIG. 7 a timespan T significant for the discharge characteristic is measured. Because the value of R is known, the momentarily prevailing capacity value of capacitor 32 is calculated from the addressed timespan T as measured which capacity value is indicative of the pressure prevailing in compartment 1. According to FIG. 7 and as an example the electrode 34 of capacitor 32 is operated on a reference electric potential as e.g. on ground potential, whereas the second tap of resistive element R is operated virtually on the addressed reference potential, in that it is applied to the inverting input of an operational amplifier unit 42. The positive input to the amplifier unit 42 is operated on reference potential as well. Thus, at the output of amplifier unit 42 and depending on the amplification set at the amplifier unit 42, a signal $s_{42}$ is generated picturing the discharge current of capacitor 32 through resistive element R. The output signal of amplifier unit 42 is input to a comparator unit 44 comprising e.g. a Schmitt trigger. At the comparator unit 44 there is set a first voltage level $L_L$ for input signal $S_{42}$, at which the output $s_{44}$ of the comparator unit 44 jumps from a first state to a second state, and a second level $L_H$ for input signal $S_{42}$, at which the output $s_{44}$ of the comparator unit 44 jumps back to the first state. The levels $L_L$ and $L_H$ are set according to subsequent voltage levels passed by the discharge indicative signal $s_{42}$, as capacitor 32 is discharged via resistive element R. E.g. the two levels may be set so that the timespan the discharge process needs to pass from $L_L$ to $L_H$ accords with the momentarily prevailing time constant $\sigma=C(p)\cdot R\Omega$, wherein $R\Omega$ denotes the resistivity value of element R.

The output signal $S_{44}$ and thereby specifically the time extent T of the output pulse is significant for the momentarily prevailing capacity value of capacitor 32. In a time measuring unit 46 a highly accurate measurement of the timespan T is performed and, based on the known characteristic of the capacitance pressure sensor, i.e. the known dependency of C(p) from pressure p, the pressure momentarily prevailing in compartment 1 is calculated in unit 48. Charging and discharging capacitor 32 is controlled as schematically shown via switch $Q_3$ by means of a clock unit 50. Given the fundamental frequency $f_o$ of pulsating pumping effect of pump 3, charging and discharging of the capacitor 32 is performed at a repetition or sampling frequency $f_a$ which is significantly higher than the addressed pulsating frequency $f_o$. In a good embodiment the repetition or sampling frequency is at least 10 times, in an even better embodiment at least 20 times, higher than the addressed pulsating fundamental frequency $f_o$. The addressed sampling frequency $f_s$ is selected to be at least 1 kHz, even better at least 10 kHz, which accords with fundamental frequencies $f_o$ of customary pumps 3. Thus, by the addressed sensing technique the pressure course in compartment 1 is sampled at a respectively high sampling frequency. At the output of comparator unit 44 pulses are generated at the addressed charging and discharging frequency $f_s$, controlled by the clock unit 50.

In unit 48 the sample results according to the sampled pressure values of the pressure course in compartment 1 are e.g. stored resulting in a stored pressure course as schematically shown in unit 48, which may be directly displayed, as by a display or printer as shown at 49 in FIG. 7. In a good embodiment, the stored pressure course or at least parts thereof, e.g. according to a pulsating period $T_o$ or of a part thereof is fed to the comparing unit 50 according to comparing unit 17. The shape of the prevailing pressure course pulsating is machine-compared with the reference signal from reference unit 20, the result of such comparing is exploited as an indication of the operation-state of pump arrangement 3,5 as was addressed above.

We have mentioned that the result of comparing the prevailing shape of pulsating of the pressure prevailing in compartment 1 may be representative for proper or non-proper operation of pump arrangement 3, 5. Thus and as schematically shown in FIG. 7, the output signal, i.e. the result of comparing e.g. at unit 50, may be exploited as a control deviation signal in a negative feedback control loop so as to negative feedback control operation of the pump arrangement 3, 5. Via a respective controller unit 52 e.g. the operation of the pump 3, e.g. rotational speed and/or flow of controlling valves upstream and/or downstream pump 3, may be negative feedback controlled so as to provide a shape of pulsating of the pressure prevailing in compartment 1 substantially equal to the one as set, as a control variable, in reference unit 20. As perfectly clear to the skilled artisan the negative feedback control loop comprises as a source of desired value the reference unit 20. The comparing unit 50 provides for the control deviation. The entity to be controlled, namely the shape of pressure pulsating in compartment 1, is sensed by the capacitance pressure sensor 30 and the subsequent signal processing and evaluating units.

Very accurate and high speed measurement of the timespan T or more generically of a timespan significant for the discharging process of capacitor 32 through resistive element R is performed by constructing the time measuring unit 46 as a Time to Digital Converter (TDC). Especially in this case subsequent signal processing as by unit 48, comparing unit 50 is performed digitally, e.g. by Digital Signal Processing unit (DSP), realized e.g. by an ASIC.

Whereas we have up to now described the method and apparatus according to the invention based on signal processing in time domain, it is perfectly clear to the skilled artisan that the shape of pulsating which is surveyed according to the method and apparatus of the invention, may be represented in frequency domain. Thus, at least a part of signal processing and evaluation may be performed in the frequency domain.

Still with an eye on FIG. 7 we have addressed that the result of the comparison at unit 50 may be exploited as negative feedback deviation signal in a negative feedback control loop, wherein e.g. operation of the pump 3 is adjusted so as to achieve a shape of prevailing pulsating which accords as close as possible to the shape of reference signal pulsating.

If at the comparing unit 50 not only the shape of the prevailing pressure course pulsating in compartment 1 is compared with the shape of a reference pulsating signal, but also the prevailing average values of the addressed pressures are compared, then the output signal of the comparator unit 50 may also be exploited as a control deviation signal for negative feedback controlling the average pressure value in compartment 1 to be adjusted on a value equal to the desired value.

Figure 8:
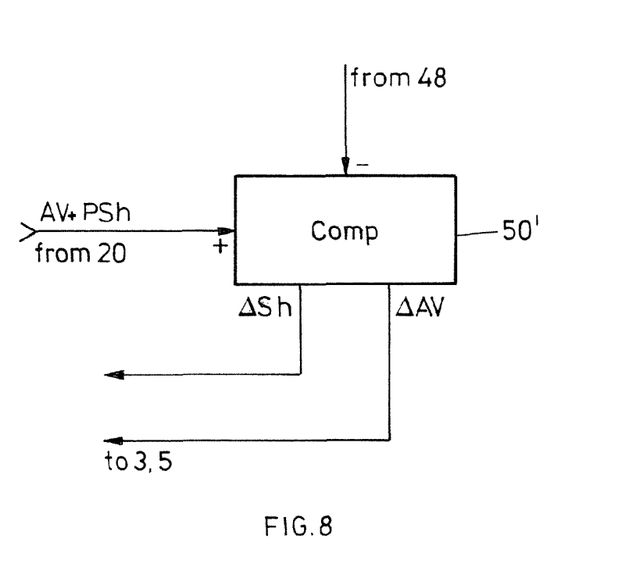
FIG. 8: a part of the apparatus according to FIG. 7, constructed for negative feedback loop control of the apparatus according to FIG. 7.

FIG. 8, which is again a simplified and schematic signal flow/functional clock diagram, shows the principle operation of a comparing unit 50' so as to realize average pressure control as well as pulse shape control. From the unit 48 as of FIG. 7 a signal representing the pressure course in compartment 1 is fed to comparing unit 50'. From the reference signal source 20 a signal is fed to the comparing unit 50', which represents a reference or desired pressure course in compartment 1. So as to flexibly vary the desired value of average pressure value, the reference signal source may be provided with an adjustable reference average signal by a unit 21 as shown in dashed line in FIG. 7. For instance by low pass filtering the signal from unit 48 and by comparing the resulting average pressure representing signals, a control deviation signal $\Delta AV$ is generated at unit 50', which is indicative for the deviation of the prevailing pressure level in compartment 1 from a desired pressure level represented by the—possibly adjustable—reference average signal from reference unit 20. This control deviation signal is exploited to accordingly adjust e.g. the operation of pump 3 and/or of valves of the lines 5, so as to minimize the control deviation signal $\Delta AV$ via a respective controller unit (not shown). E.g. high pass filtering the signal from unit 48, the pulsating signals to be compared in comparing unit 50' are generated, which represent on one hand the prevailing pressure pulsating in compartment 1 with prevailing pulsating shape and, on the other hand, the stored reference pulsating and reference pulsating shape. By comparing in unit 50' these two shape-representing signals a shape difference signal $\Delta Sh$ is generated, which may be exploited, according to FIG. 7, to adjust e.g. the operation of pump 3 and/or of adjustable members as of valves in the lines 5 so, that the prevailing shape of pressure pulsating in compartment 1 fits as closely as possible the reference pulsating shape.

In view of the addressed negative feedback control adjustment of the pump 3 it may be necessary to vary its operating speed as e.g. rotational speed of a rotary pump. In such case the fundamental frequency of pulsating of the pressure course prevailing in compartment 1 may become different from the fundamental frequency at which the reference signal pulsating has been registered. In view of the fact that according to the present invention it is the shape of pulsating which is exploited, it is possible to perform a shape comparison of pulsating signals even if pulsating frequency and possibly even pulsating amplitudes are not equal. This may be performed by respectively stretching or compressing at least one of the signal representing the prevailing pulsating and of the signal representing the reference pulsating. This may be performed e.g. by digital signal processing in a digital signal processing unit.

Figure 9:
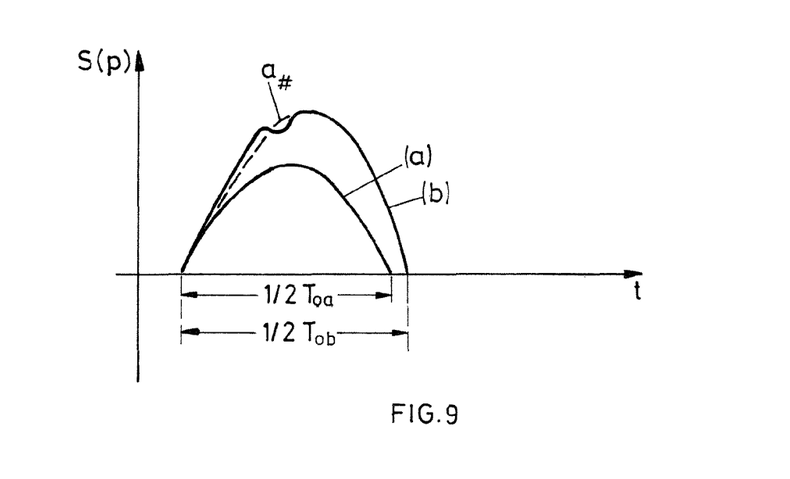
FIG. 9: qualitatively how the pulsating shape of different frequency and/or different amplitude pressure pulsating courses may be mutually adapted for comparing purposes.

FIG. 9 shows qualitatively such technique so as to facilitate shape comparison even at pulsating signals of differing pulsating frequencies and/or of differing amplitudes. In FIG.

9 course (a) represents e.g. the reference pulsating shape over half a pulsating period $T_o a$. The prevailing pulsating (b) occurs at a lower frequency than the frequency of the reference pulsating according to (a) and additionally at a higher amplitude. By digitally stretching e.g. the reference pulsating half-wave according to (a), a digitally calculated adapted reference pulsating shape signal $a_\#$ is generated having the same amplitude as the prevailing pulsating signal (b) and according to the same frequency of the prevailing pulsating signal (b). Comparing the prevailing pulsating shape (b) with the adapted reference pulsating shape $a_\#$ results in a comparison result which is still highly significant for the operation status of pump arrangement 3,5. E.g. by performing the adaptation technique as explained in context with FIG. 9 it becomes possible to perform negative feedback controls as of FIGS. 7 and 8, thereby acting on the operational speed of pump 3 as adjusted variable in the negative feedback control loop.

Because of the high sampling frequency $f_s$ established by charging/discharging capacitor 32 and a fast and accurate time measurement, as by Time to Digital Conversion at unit 46, the sampling and conversion technique as principally applied in the embodiment of FIG. 7 is highly suited for negative feedback control purposes as addressed. With an eye on charge/discharge sampling as exemplified in FIG. 7, it is perfectly clear to the skilled artisan, that instead of monitoring the discharge process or additionally thereto the charging process of the capacitor 32 through a respective resistive element, acting in analogy to R, may be practiced.

Figure 10:
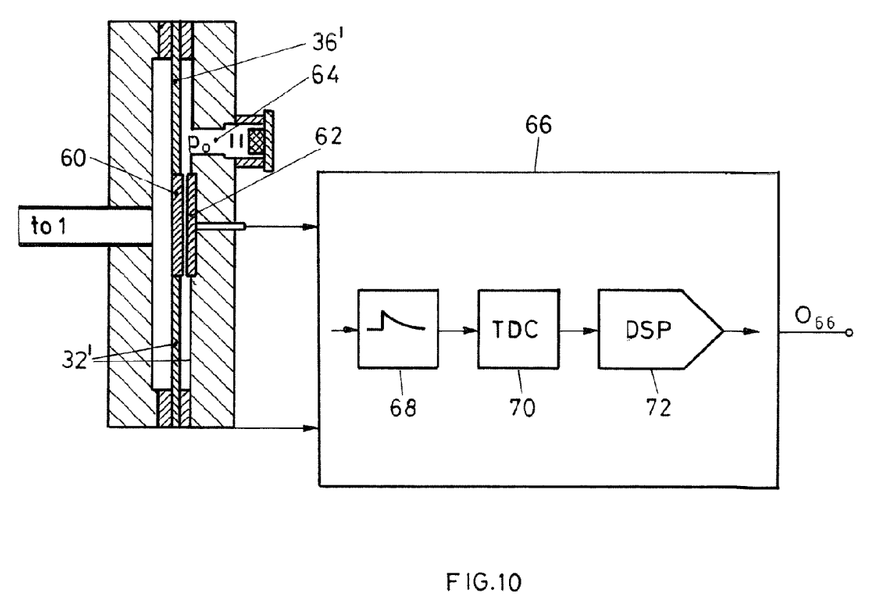
FIG. 10: most schematically and simplified an embodiment of the apparatus according to the invention and operating the method according to the invention, constructed principally according to the embodiment of FIG. 7, with a ceramic membrane capacitance pressure sensor and as used for providing measurement results as of FIGS. 11 and 12.

In FIG. 10 there is shown schematically and simplified an apparatus according to the present invention and operating the method of the invention, by which the prevailing pressure course in compartment 1 as of FIG. 7 is sensed including the shape of pulsating. As a capacitor pressure sensor a sensor as amply disclosed in the WO 2007/019714 to the same applicant as the present invention was used. Therein, the capacitor 32', the capacity of which being dependent on the pressure to be sensed, is formed by a membrane 36' of a ceramic material as of $Al_2O_3$ and comprises an electro conductive layer as of a metal 60. The second electrode of capacitor 32' is formed by a rigid electro conductive element 62 as of a metal. The sealed interspace 64 between the electrodes 36', 62 is the reference pressure chamber according to compartment 38 of FIG. 7 and is loaded to a predetermined constant pressure $p_o$. The surface of membrane 36' opposite interspace 64 is in flow communication with compartment 1 according to FIG. 7. The capacitor 32' is electrically tapped off and connected to a unit 66, wherein charging and discharging operation, following the principles as explained in context with FIG. 7, is performed at a sampling unit 68, the discharge timespan is measured by a Time to Digital Converter unit 70 according to time measurement unit 46 of FIG. 7, and time to pressure conversion is performed by a Digital Signal Processing (DSP) unit 72 in analogy to unit 48 of FIG. 7. The signal output at output $O_{66}$ accords with the sampled pressure course prevailing in compartment 1 including pulsating shape. It is this output signal which is possibly further processed by comparing with a reference signal representing a desired pressure course as was explained e.g. in context with comparing unit 50, 50' with the help of the FIGS. 7 and 8.

Figure 11:
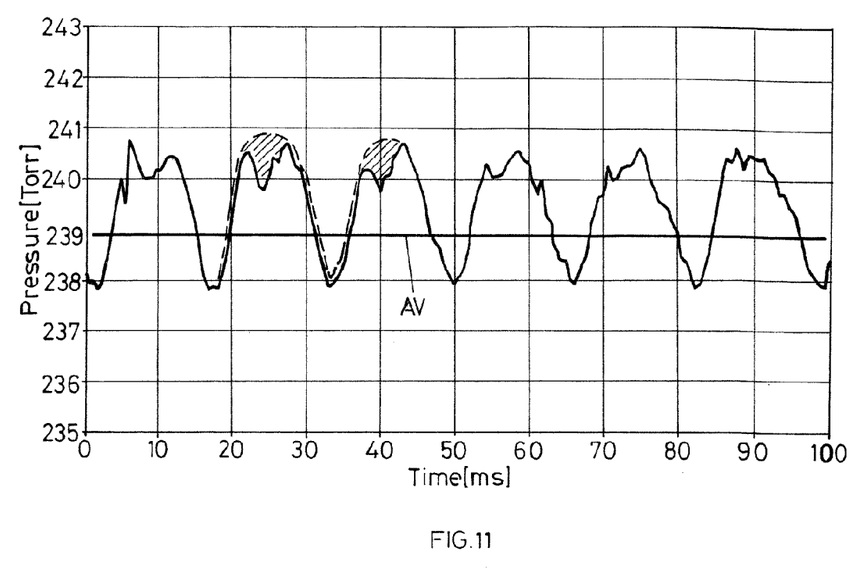
FIG. 11: the output signal of an apparatus according to FIG. 7 or 10, representing the pulsating pressure course in a compartment as established by a specific pump.

A compartment 1 having a volume of about 46 cm³ was pumped with a pump MVP-003 of former Balzers AG. The pressure course in compartment 1 was sensed with an apparatus and a method as of the embodiment of FIG. 10. The pressure representing output signal at $O_{66}$ of FIG. 10 is shown in FIG. 11. The pulsating of the pressure in compartment 1 is about 70 Hz. The sampling frequency is about 1.5 KHz.

It may be seen from FIG. 11 that the pulsating component of the pressure prevailing in compartment 1 is most accurately appearing in the output signal of unit 66 with an accurately defined shape of pulsating. Assuming a desired or nominal pulsating for that type of pump as e.g. drawn in FIG. 11 by dashed line it becomes apparent that, due to accurate monitoring the prevailing pressure course in compartment 1, an accurate comparison of the shape of pulsating with a nominal or desired reference shape of such pulsating becomes possible.

Figure 12:
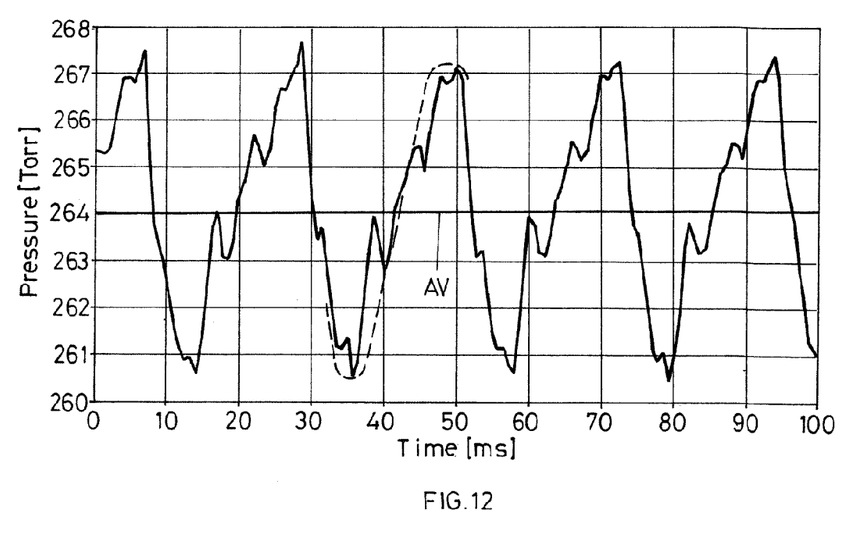
FIG. 12: a representation of the addressed output signal according to FIG. 11, resulting from another pump for evacuating the compartment.

Further, a pump MVP003-2 of the firm Pfeiffer was applied to a compartment of about 36 cm³ inner volume. With the apparatus according to FIG. 10 the prevailing pressure course in compartment 1 was sensed. The result is shown in FIG. 12. As may be seen the frequency of pulsating according to FIG. 12 is about 50 Hz. The sampling frequency as set in unit 66 of FIG. 10 is about 1.5 KHz.

It is highly apparent that the shape of pulsating when operating the MVP003-2 pump is significantly different from the shape of pulsating when operating the MVP003 pump. Assuming as shown in dashed line in FIG. 12 a desired or rated reference shape of pulsating, it becomes evident that the accurate monitoring of the prevailing pressure in compartment 1 allows here too an accurate comparison with such reference shape of pulsating so as to conclude from the comparing result upon operating status of the pump arrangement as of aging, etc. In FIG. 11 as well as in FIG. 12 the line AV shows the pressure course average value of the pressure course in compartment 1 and thus the pressure value to be established by pump 3 in the compartment 1, e.g. to practice a vacuum manufacturing process therein, as e.g. a vacuum-coating or vacuum-etching process.

By the method and apparatus according to the present invention it is achieved that during pressure measuring the operation of the pump, which establishes such pressure, may be surveyed. Thus, a common pressure sensor arrangement Is used for both, pressure measuring and monitoring operating status of the pump arrangement.

The invention claimed is:

1. A method of measuring a vacuum-pressure of a gas in a compartment, said pressure being established by the action of a pump arrangement having a pulsating pumping effect, configured to cause a pulsating pressure course in said compartment, said pulsating pressure course occurring at a fundamental frequency when said vacuum-pressure is established, comprising monitoring said established vacuum-pressure and exploiting a shape of pulsating of said vacuum pressure as an indication of an operation status of said pump arrangement.

2. The method of claim 1 comprising
evacuating by said pump arrangement said compartment;
monitoring by means of a pressure sensor the prevailing pressure course in said compartment including shape of pulsating of said pressure course, thereby generating a measuring signal representing said prevailing pressure course; and
generating in dependency of the output signal of said pressure sensor a signal indicative of the prevailing pressure in said compartment averaged over at least one period of said pulsating.

3. The method of claim 2, wherein monitoring said prevailing pressure course in said compartment comprises sampling a signal depending from an output signal of said pressure sensor at a sampling frequency which is at least 10 times higher than the fundamental frequency of said pulsating of said prevailing pressure course in said compartment.

4. The method of claim 3, wherein said sampling frequency is at least 20 times higher than the fundamental frequency.

5. The method of claim 3, wherein said sampling frequency is at least 1 kHz.

6. The method of claim 3, wherein said sampling frequency is at least 10 kHz.

7. The method of claim 2, wherein said monitoring by said sensor comprises
providing a measuring capacitor with two electrodes, the capacity of said capacitor being dependent from said pressure in said compartment;
electrically monitoring the course of said capacity of said capacitor.

8. The method of claim 7, monitoring said course of said capacity by sampling each single sampling comprising:
charging and discharging said capacitor, thereby performing at least one of said charging and of said discharging of said capacitor via a resistive element of predetermined resistivity, which, together with said capacity is decisive for the time course of said at least one of charging and of discharging, measuring a time span during said at least one of charging and of discharging said capacitor, between a first predetermined charging level and a second predetermined charging level of said capacitor.

9. The method of claim 8, said measuring of said time span being performed by Time to Digital Conversion (TDC).

10. The method of claim 7, wherein one of said electrodes comprises a ceramic material membrane, preferably made of $Al_2O_3$.

11. The method of claim 2 further comprising:
providing a reference signal representing at least a part of a reference shape of pulsating, and comparing said measuring signal and said reference signal, the result of said comparing being exploited as indication of the prevailing operation status of said pump arrangement.

12. The method of claim 11 comprising providing said reference signal by
evacuating by a reference pump arrangement of equal construction as said pump arrangement a reference compartment;
monitoring by means of a further pressure sensor the prevailing reference pressure course in said reference compartment including reference shape of pulsating of said reference pressure course thereby generating a reference signal;
storing at least a part of said reference signal representing at least a part of the reference shape of pulsating of said reference pressure course.

13. The method of claim 12 wherein said reference compartment is equal or is said compartment.

14. The method of claim 12 wherein said further sensor is equal to said sensor or said further sensor is said sensor.

15. The method of claim 12 claim wherein the reference pump arrangement is said pump arrangement.

16. The method of claim 12, wherein monitoring said reference pressure course in said reference compartment comprises sampling a signal depending from an output signal of said further sensor at a sampling frequency which is at least 10 times higher than said fundamental frequency of pulsating of the reference pressure course.

17. The method of claim 16, wherein said sampling frequency is at least 20 times higher than the fundamental frequency.

18. The method of claim 16, wherein said sampling frequency is at least 1 kHz.

19. The method of claim 16, wherein said sampling frequency is at least 10 kHz.

20. The method of claim 12 wherein said monitoring by said further sensor comprises
providing a measuring capacitor with two electrodes, the capacity of said capacitor being dependent from said pressure in said reference compartment;
electrically monitoring the course of said capacity of said capacitor.

21. The method of claim 12, further comprising negative feedback controlling at least one of the pressure value in said compartment, averages over at least one period of said pulsating, and of shape of said pulsating, thereby exploiting a difference of said reference signal to said signal representing at least a part of the pressure course prevailing in said compartment, as a control deviation signal and said pump arrangement as adjusting member.

22. The method of claim 1, wherein signal processing comprises digital signal processing.

23. An apparatus for measuring vacuum pressure in a compartment evacuated by a pump arrangement causing a pulsating pressure course in said compartment, said pulsating pressure course occurring at a fundamental frequency when said vacuum-pressure is established in said compartment, comprising
monitoring means for monitoring at least a part of the pulse shape of a pulsating pressure,
evaluation means for evaluating said monitored part of said shape;
generating means for generating a pressure indicative signal representing an averaged pressure value, averaged over a predetermined time span.

24. The apparatus of claim 23, said monitoring means and said generating means comprise a common capacitance pressure sensor with a capacitor, the capacity thereof being dependent from an input pressure to be measured and charging/discharging means for charging and discharging said capacitor, thereby at least one of charging and of discharging being performed through a resistive element, defining together with said capacitor the course of said at least one of charging and of discharging, and time measuring means for measuring a time span characteristic for said at least one of said charging and of said discharging through said resistive element.

25. The apparatus of claim 24, comprising a clock unit, controlling said charging and discharging at a sampling frequency which is at least 10 times higher than the fundamental frequency of an expected pulsating of said pulsating pressure.

26. The apparatus of claim 25, wherein said sampling frequency is at least 20 times higher than the fundamental frequency.

27. The apparatus of claim 25, wherein said sampling frequency is at least 1 kHz.

28. The apparatus of claim 25, wherein said sampling frequency is at least 10 kHz.

29. The apparatus of claim 24, said time measuring means comprising a Time to Digital Convert.

30. The apparatus of claim 29, said evaluation means comprising a digital signal processing unit.

31. The apparatus of claim 23, said monitoring means and said generating means comprising a common pressure sensor and at least said monitoring means comprising sampling means for sampling the output signal of said common pressure sensor at a sampling frequency which is at least 10 times higher than a base frequency of an expected pressure pulsating to be evaluated by said evaluation means.

32. The apparatus of claim 31, wherein said sampling frequency is at least 20 times higher than the fundamental frequency.

33. The apparatus of claim 31, wherein said sampling frequency is at least 1 kHz.

34. The apparatus of claim 31, wherein said sampling frequency is at least 10 kHz.

35. The apparatus of claim 23, wherein said monitoring means and said generating means comprises a common capacitor pressure sensor with a capacitor, the capacity thereof being dependent from an input pressure, said capacitor comprising a membrane electrode of a ceramic material, preferably made of $Al_2O_3$.

36. The apparatus of claim 23, wherein said evaluation means comprises comparing means for comparing a signal representing at least said part of said shape with a signal representing at least a part of a reference shape.

37. The apparatus of claim 23, wherein said evaluation means comprises comparing means for comparing a signal representing a prevailing pressure with a reference signal representing a desired pressure, the result of said comparing being applied to adjust operation of said pump arrangement in at least one negative feedback loop.

* * * * *